United States Patent
Grosse Wienker et al.

(10) Patent No.: US 9,420,743 B2
(45) Date of Patent: Aug. 23, 2016

(54) HARVESTING MACHINE FOR PICKING UP CROP INCLUDING A CONTAINER FOR FEEDING FLUID TO CROP PICKED UP BY THE HARVESTING MACHINE

(71) Applicant: CLAAS SELBSFAHRENDE ERNTEMASCHINEN GMBH, Harsewinkel (DE)

(72) Inventors: Lukas Grosse Wienker, Wadersloh (DE); Ludger Laumeier, Rietberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 176 days.

(21) Appl. No.: 14/281,176

(22) Filed: May 19, 2014

(65) Prior Publication Data
US 2014/0360148 A1 Dec. 11, 2014

(30) Foreign Application Priority Data
Jun. 6, 2013 (DE) .......... 10 2013 105 821

(51) Int. Cl.
| | | |
|---|---|---|
| *A01G 25/09* | (2006.01) | |
| *E01C 19/16* | (2006.01) | |
| *E01H 3/02* | (2006.01) | |
| *A01D 43/14* | (2006.01) | |
| *A01F 15/08* | (2006.01) | |

(52) U.S. Cl.
CPC ............ *A01D 43/14* (2013.01); *A01F 15/0816* (2013.01)

(58) Field of Classification Search
CPC .......... B05B 7/262; B05B 9/06; B05B 12/02; B05B 15/002; B05B 3/10; A01F 15/0816; A01D 43/14
USPC ........... 239/172, 11, 304; 100/73, 35; 56/16.8
See application file for complete search history.

(56) References Cited

U.S. PATENT DOCUMENTS

| | | | | |
|---|---|---|---|---|
| 4,220,998 A | * | 9/1980 | Kays .......................... | B05B 9/06 239/162 |
| 4,228,638 A | * | 10/1980 | Rabe ................... | A01F 15/0816 100/74 |
| 4,352,267 A | * | 10/1982 | Mellinger ........... | A01F 15/0816 100/71 |
| 4,392,611 A | * | 7/1983 | Bachman ............ | A01M 7/0089 222/613 |
| 4,542,855 A | * | 9/1985 | Stacey ...................... | B05B 5/08 239/124 |
| 4,714,196 A | * | 12/1987 | McEachern ............... | B05B 9/06 239/127 |
| 4,723,709 A | * | 2/1988 | Curran, Jr. .......... | A01M 7/0042 137/208 |
| 6,848,627 B2 | * | 2/2005 | Oepping ................ | A01D 43/14 239/11 |
| 7,370,575 B2 | * | 5/2008 | Kraus .................. | A01D 89/006 100/73 |
| 8,359,820 B2 | * | 1/2013 | Dohrmann ............. | A01D 43/14 239/329 |
| 8,567,311 B2 | * | 10/2013 | Kraus ................. | A01F 15/0816 100/35 |
| 2004/0226584 A1 | * | 11/2004 | Guest .................. | A47L 11/4044 134/36 |
| 2005/0077389 A1 | * | 4/2005 | Lebeda ................... | A01D 43/14 239/302 |

FOREIGN PATENT DOCUMENTS

| | | | | |
|---|---|---|---|---|
| DE | 10 2009 002 102 | | 10/2010 | |
| DE | 202012103150 U1 | * | 1/2014 | ............. B65D 25/20 |
| SU | 1498422 a | * | 8/1989 | ............. A01D 43/08 |

* cited by examiner

*Primary Examiner* — Árpád Fábián-Kovács
(74) *Attorney, Agent, or Firm* — Michael J. Striker

(57) ABSTRACT

A harvesting machine for picking up crop includes a container with a closable filler neck used to accommodate a fluid that is fed by at least one supply system to crop picked up by the harvesting machine. The container has at least one further, closable opening, through which at least one additional container is inserted into the container. The additional container is fillable with a fluid and has contents that can be mixed with the fluid present in the container.

8 Claims, 3 Drawing Sheets

HARVESTING MACHINE FOR PICKING UP CROP INCLUDING A CONTAINER FOR FEEDING FLUID TO CROP PICKED UP BY THE HARVESTING MACHINE

CROSS-REFERENCE TO A RELATED APPLICATION

The invention described and claimed hereinbelow is also described in German Priority Document DE 10 2013 105821.3, filed on Jun. 6, 2013. The European Priority Document, the subject matter of which is incorporated herein by reference, provides the basis for a claim of priority of invention under 35 U.S.C. 119(a)-(d).

BACKGROUND OF THE INVENTION

The invention relates to a harvesting machine for picking up crop comprising a container with a closable filler neck used to accommodate a fluid that can be fed by a supply system to crop picked up by the harvesting machine.

A known harvesting machine for picking up crop is disclosed in application DE 10 2009 002 102 A1. The machine described therein is a self-propelled forage harvester comprising a container embodied as a tank for accommodating an ensilage agent that is applied onto the crop conveyed in the forage harvester during the harvesting process. Ensilage agent is used to promote the fermentation process, improve the feed value of the silage and to prevent the formation of sources of putrefaction in the crop. The ensilage agent is a mixture composed of one or more chemicals and water. The ensilage agent that is used is mixed at the onset of a harvesting operation and is filled into the tank provided therefor on the forage harvester.

Disadvatageously, the quantity of ensilage agent required must be quantitatively estimated in advance, which can result in residual quantities in the container. Residual quantities post use are generally no longer usable after a short period of time, since lactic acid bacteria or enzymes contained in the ensilage agent (for example) have a limited life span if not properly stored. The ensilage agent located in the container is applied, in a targeted manner, to the crop conveyed in the forage harvester by means of a supply system comprising a metering device.

A further disadvantage is that separate systems for metering are required when ULV (ultra-low volume) ensilage agents are used, when the intention is to use these ULV ensilage agents in addition to a diluted mixture of ensilage agent or as an additive to the water located in the tank. In that case, the ULV ensilage agent is disposed in a separate container on the harvesting machine and is connected to the separate metering system. Due to this additional arrangement, greater effort is required to monitor and control the metering and a relatively large amount of installation space is required on the harvesting machine. In addition, the effect of solar radiation and heat dissipated by an engine of the harvesting machine on the ULV ensilage agent located in the separate container is great, since excess heating causes the microorganisms to die.

SUMMARY OF THE INVENTION

The present invention overcomes the shortcomings of known arts, such as those mentioned above.

To that end, the invention provides a harvesting machine for picking up crop comprising a container with a closable filler neck used to accommodate a fluid that can be fed by at least one supply system to crop picked up by the harvesting machine.

The container has at least one further closable opening, through which at least one additional container that can be filled with fluid can be inserted into in the container, the contents of which can be mixed with the fluid present in the container.

The advantage of inserting the at least one additional container into the container is that fluid present in the container is used to cool the fluid present in the at least one additional container. The temperature of the fluid in the at least one, additional container is held largely constant, since the fluid enclosing the at least one additional container is heated more slowly, by dissipated heat or solar radiation, in the container, which is substantially larger.

A further advantage results from the fact that the fluids are different substances and are separated from one another. For example, the container may contain only water, while the at least one additional container contains ensilage agent in a high concentration, so-called ULV (ultra low volume) ensilage agent, and/or any other type of additive. Upon conclusion of a harvesting operation, the at least one additional container can be removed, provided fluid is still present in the additional container, and delivered for proper storage for subsequent use. The same applies when the container already contains an ensilage-agent mixture, to which a further ensilage agent and/or any other type of additive shall be added.

It also is possible to use the at least one additional container for the same fluid that is contained in the container, for example, water or a prepared ensilage-agent mixture. If the at least one additional container is not required, this can be removed in order to increase the volume of the container.

In particular, the at least one additional container can close the container in a sealing manner toward the outside. As a result, mutual contaminations of the fluids contained in the container and in the additional container can be prevented.

In terms of mixing, it is advantageous for the additional container to be connectable to the at least one supply system. This makes it possible to achieve an as needed mixture and application of ensilage agent depending on crop parameters such as moisture content or ingredients.

For insertion Into the container, the additional container is screwed on the container by a threaded section on the additional container and a corresponding threaded section on a neck on the container, which forms the opening. The additional container therefore closes the further opening of the container instead of a closing cover.

In order to simplify the insertability into the container, the additional container is designed as a hollow cylindrical body having an outer contour adapted, at the least, to the contour of the opening. Moreover, the additional container is formed with sections that are at least partially adapted to the outer contour of the container to be accommodated, thereby enabling the additional container to be supported against the wall of the container. In order to permit affixation on a wall of the container, a thorn-shaped projection is provided on the additional container, which engages in a corresponding recess in the container. Such a projection is provided in the bottom region of the additional container, in particular.

Preferably, the at least one additional container comprises a fill level sensor. This fill level sensor functions on the basis of ultrasound and is connected to a control unit of the harvesting machine, which informs an operator about the current fill level of the at least one additional container. A related fill level sensor also can be provided in the container and can be connected to the control unit for the purpose of data transfer.

In an embodiment, a receiving mechanism is disposed in the interior of the container, underneath the at least one opening and proceeding therefrom. The receiving mechanism holds and supports the additional container in the interior of the container and is used for guidance when the additional container is inserted into the container.

To this end, the receiving device in the interior of the container is integrally formed thereon. The integral formation of a receiving mechanism in the interior of the container during production thereof depends on the complexity of the contour of the container.

In an embodiment, the receiving mechanism is suspended in the container, thereby allowing the receiving mechanism to be used only as needed, i.e., when the additional container is inserted into the container.

In this case, the receiving mechanism at least partially encloses the additional container accommodated therein. The receiving mechanism holds the additional container in the interior of the container and, simultaneously, permits direct contact by the fluid located in the container with the outer wall of the additional container, thereby ensuring that sufficient cooling is achieved.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
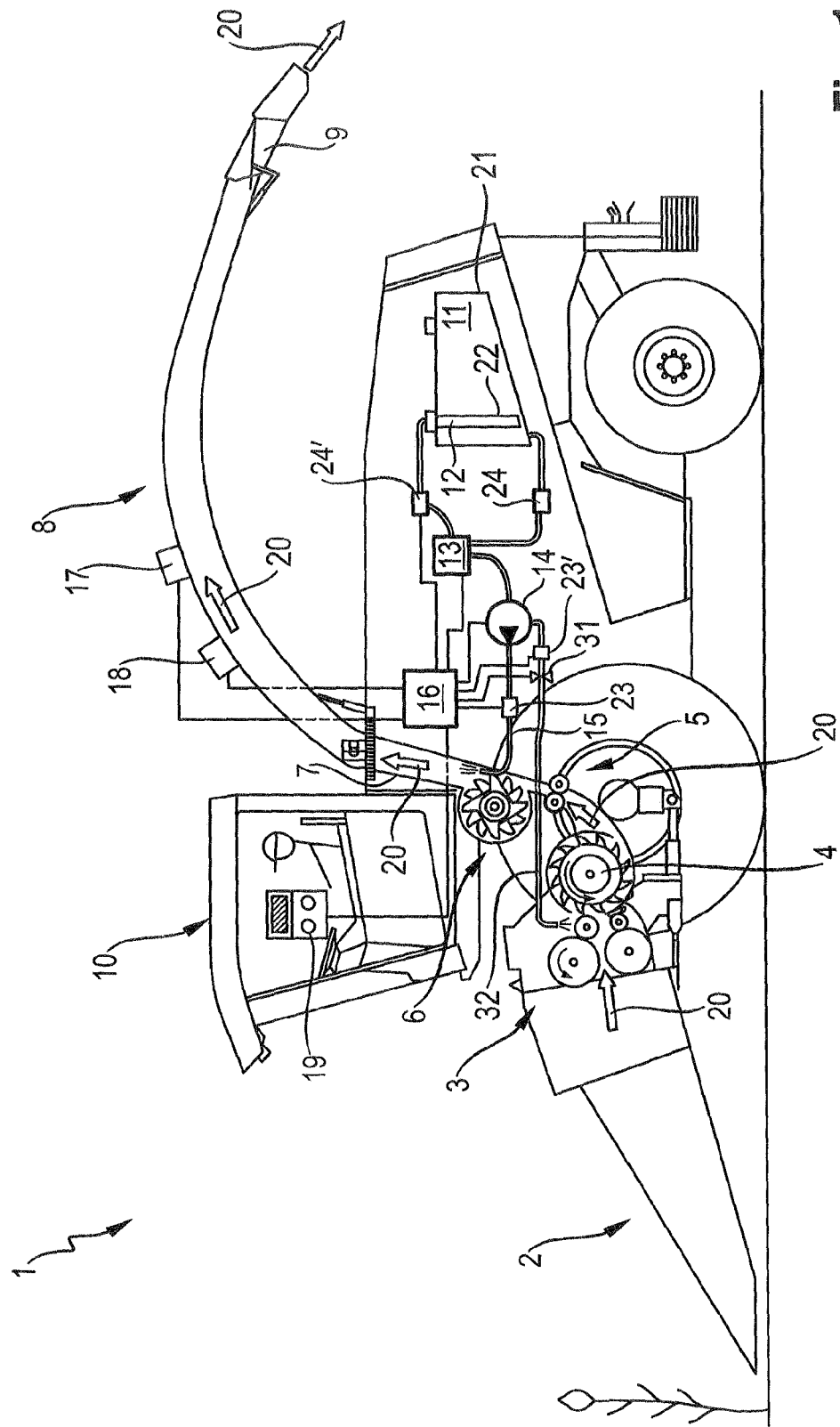
FIG. 1: presents a schematic side view of an agricultural harvesting machine comprising a container constructed according to the inventive principles.

FIG. 1 illustrates shows an agricultural harvesting machine according to the invention in the form of a self-propelled forage harvester 1, which is configured to pick up crop. It is pointed out that the invention can also be implemented on other harvesting machines that process a crop stream, for example, combine harvesters, self-loading forage wagons or balers, and results in comparable effects and advantages.

The forage harvester 1 shown in FIG. 1 is equipped with front and rear wheels for travel over a field having a plant stand (indicated by way of a plant, which is not described in further detail), and is driven via an engine. In harvesting operation, the forage harvester 1 cuts plant material from the field using a front harvesting attachment 2 mounted on the front side of the machine frame and feeds the crop 20 obtained in this manner to an intake assembly 3 equipped with a plurality of compression rollers (the conveyance path through the machine is indicated by arrows).

After pre-compression there, the crop 20 reaches the chopper drum 4, which chops up the crop 20 via interaction with a stationary shear bar (not shown). By way of a conveyor chute 7, which rises downstream of the chopper drum 4, the chopped crop 20 is processed by a conditioning device 5 (optional) and is additionally accelerated by a post-accelerator 6 and then enters an arcuate transfer device 9, in order to be ejected from the forage harvester 1 via the discharge flap 9 thereof, which faces away from the machine, for loading a (not-shown) collecting container.

In practical application, the ejected crop is subjected to an ensilage process for preservation and/or general refinement in order to be subsequently fed to livestock. Certain properties of the crop that promote desired biological and chemical processes in the crop are required in order to trigger or effectively maintain the ensilage process and, therefore, to achieve a good ensilage result. Since these properties are not always naturally present, the forage harvester 1 comprises a system for adding at least one auxiliary agent that promotes the ensilage process and, therefore, the quality of the crop 20.

To this end, a container 21 in the form of a tank for accommodating a fluid is housed on the forage harvester 1. The container 21 can be filled with water 11 or a liquid ensilage-agent mixture, which contains lactic acid bacteria, for example. An outflow opening is provided on the underside of the container 21 for connecting the container 21 to a supply system. The supply system comprises, inter alia, lines and a mixing unit 13. The outflow opening is connected to the mixing unit 13 by a line. A flow meter 24 is provided on the line between the container 21 and the mixing unit 13, which detects the flow through the line and, therefore, the outflow from the container 21. The flow meters 24 transmit relevant flow-quantity signals to a central control unit 16.

Figure 2:
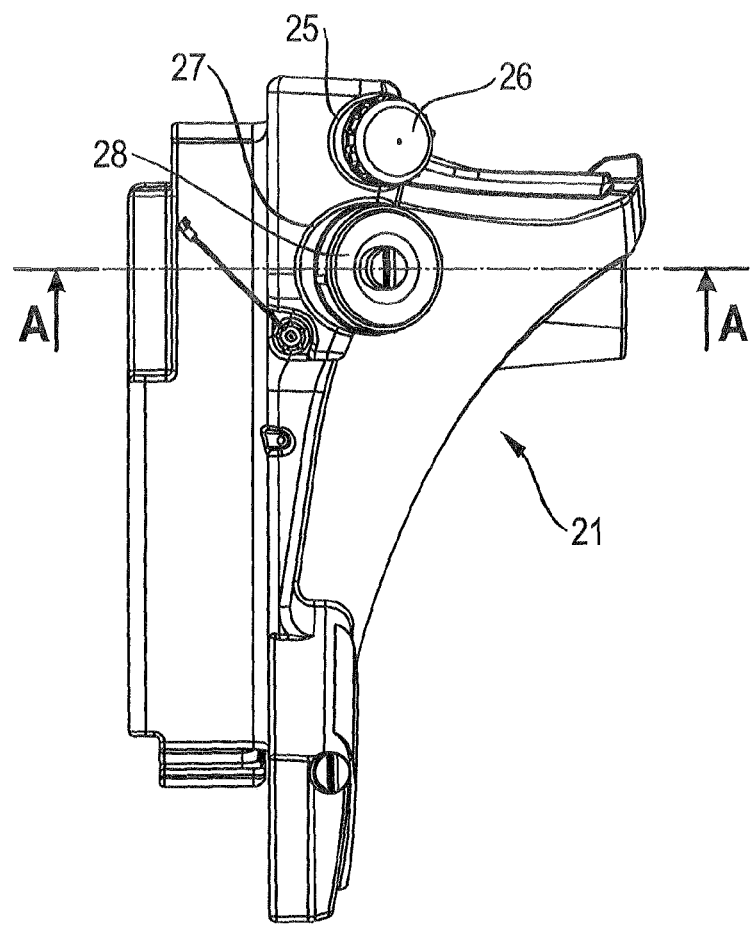
FIG. 2 depicts a top view of a container designed as a tank according to the inventive principles.
Figure 3:
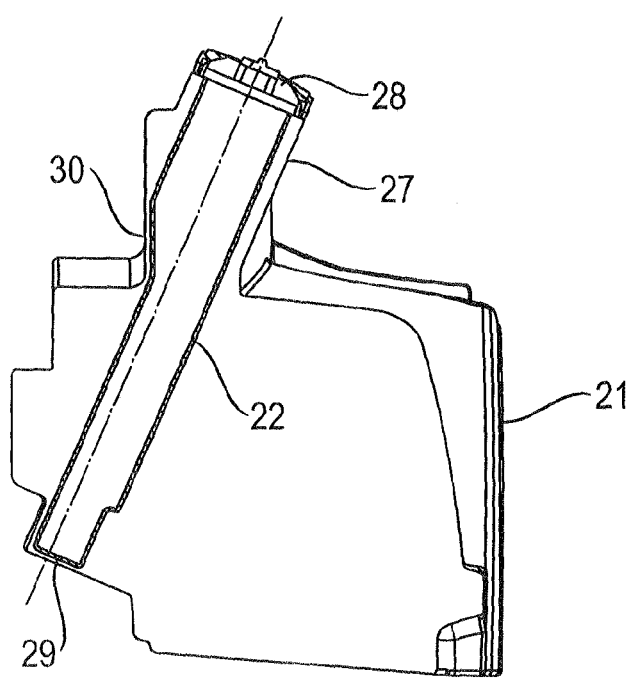
FIG. 3 depicts a sectional view along line A:A in FIG. 2.

FIG. 2 shows a top view of the container 21, which is designed as a tank and is used to accommodate a fluid such as pure water 11 or an ensilage-agent mixture. The container 21 has a filler neck 25 on the top side thereof, wherein this filler neck is closed by a cover 26. In addition, the container 21 has an opening on the top side thereof. The opening is designed as a neck 27, which is closed by a cover 28. A hollow cylindrical additional container 22 can be inserted into the container 21 through this neck 27. The additional container is supported against the walls of the container 21, as shown in FIG. 3, which shows a sectional view along the line A-A according to FIG. 2.

The hollow cylindrical additional container 22 has sections 29, 30 which are at least partially adapted to the outer contour of the container 21 and by which the additional container 22 can bear, in the interior of the container 21, against the walls of this container. The additional container 22 has an external thread on the end thereof facing the neck 27, by which the additional container 22 is screwed into the neck 27.

The additional container 22 is used to accommodate a so-called ULV (ultra low volume) ensilage agent 12, i.e., an ensilage agent having a very high concentration of active agents, which is added to the water 11 present in the container 21 or to the ensilage-agent mixture present in the container 21. To this end, the additional container 22 is connectable to the mixing unit 13 of the supply system via a line. A flow meter 24' also is provided on the line between the additional container 22 and the mixing unit 13, which detects the flow through the line and, therefore, the outflow of the ULV ensilage agent 12 from the additional container 21.

The mixing unit 13 also has a signal-based connection to the central control unit 16, in order to be actuated by the control unit 16. On the basis of control signals received from the control unit 16, the mixing unit 13 is capable of controlling the outflow quantity (=flow rates) of the water 11 and the ULV ensilage agent 12 present in the additional container 22 through the lines to the mixing unit 13.

The mixing unit 13 mixes the fluids from the container 21 and the additional container 22 in any ratio that can be set. Moreover, this permits the control unit to control the mixing unit 13 such that only one fluid 11, 12 is forwarded to the delivery pump 14, if this is appropriate. The mixing unit 13 also can be completely blocked in the event that none of the auxiliary agents present in the container 21 or the at least one additional container 22 is required, due to the harvesting conditions.

The delivery pump 14 has a variable capacity connected via a line to the output-side outlet of the mixing unit 13 in order to pump the liquid mixture, in the arrow direction shown at the delivery pump 14, first through a further flow meter 23 (for the total quantity to add) and finally through an injector 15. The injector 15 terminates in the conveyor chute 7 and opens in the direction of flow of the crop 20, thereby applying the mixture in a finely sprayed form onto the crop 20 flowing past.

As an alternative or, in addition, the liquid can be applied to the crop 20 in the region of the intake conveyor assembly 3, as indicated in FIG. 1. To this end, a line extends from the delivery pump 14 in the direction of the intake conveyor assembly 3 and leads into an injector 32. A flow meter 23' and a valve 31, both of which are connected to the control unit 16 in order to be controlled, are disposed downstream of the delivery pump 14. Therefore, the valve 31 is activated and deactivated in order to apply an additional application at only one point. It also is basically possible to apply the fluid at one or more different points along the conveyance path of the crop 20.

The delivery pump 14 also can be activated via the control unit 16, thereby permitting the total quantity of the liquid mixture to add, which is fed to the crop 20 via the injector 15, to be controlled by changing the pump output of said delivery pump. The flow meter 23, the flow signal of which is transmitted to the control unit 16, is used as feedback to regulate the total quantity of liquid to be applied to the crop 20.

The forage harvester 1 comprises a sensor system for detecting properties of the crop 20 for the purpose of automatically setting an effective dose of auxiliary agents that are added. In the exemplary embodiment shown, the sensor system comprises two sensors 17, 18 that are disposed on the back wall of the transfer device 8.

The sensor 17 is an optical sensor, which is suitable for optically detecting crop 20 that is flowing past in such a way that properties of the crop 20 can be determined on the basis of an analysis of the optical signals that are produced. Very generally, the properties can be, for example, moisture or dry mass, the physical state (inter alia, length of cut, structure of the crop), the composition of the contents, etc. An optical sensor that functions on the basis of near infrared spectroscopy in particular makes it possible, in a technically suitable manner, to reliably determine ingredients or moisture of the crop 20, which is advantageous for dosing auxiliary agents in a particularly differentiated manner. To this end, the sensor 17 has a signal-based connection to the control unit 16, thereby enabling the control unit 16 to react as quickly as possible to properties of the crop 20 that are actually present by dosing the auxiliary agents 11, 12 accordingly.

The optional sensor 18 is an additional measuring device in the form of a moisture sensor. This can operate, for example, according to the principle of an electric conductance sensor. A temperature sensor also can be integrated therein, in order to increase the accuracy of the moisture measurement by way of a combined measured-value analysis (conductance and temperature of the crop). The sensor 18 also has a signal-based connection to the control unit 16, thereby enabling the control unit 16 to react to moisture values of the crop 20 that are determined.

The forage harvester 1 further comprises a driver's cab 10, in which a control terminal 19 is disposed in a manner accessible by an operator, the control terminal having a communication link to the control unit 16. All the settings for adding ensilage agent can be implemented via the control terminal 19. In particular, desired quantities to be applied can be set manually and/or control limits for automatic dosing can be set. Advantageously, the operator can select between different crop types, wherein, when a crop type is selected, the auxiliary agent is dosed on the basis of a characteristic curve specific for the crop type, which is stored in a data base. Alternatively, in a fully automated mode, the crop type could be detected automatically, for example, by way of the optical sensor 17 or the sensor 18, thereby eliminating a manual selection.

Figure 4:
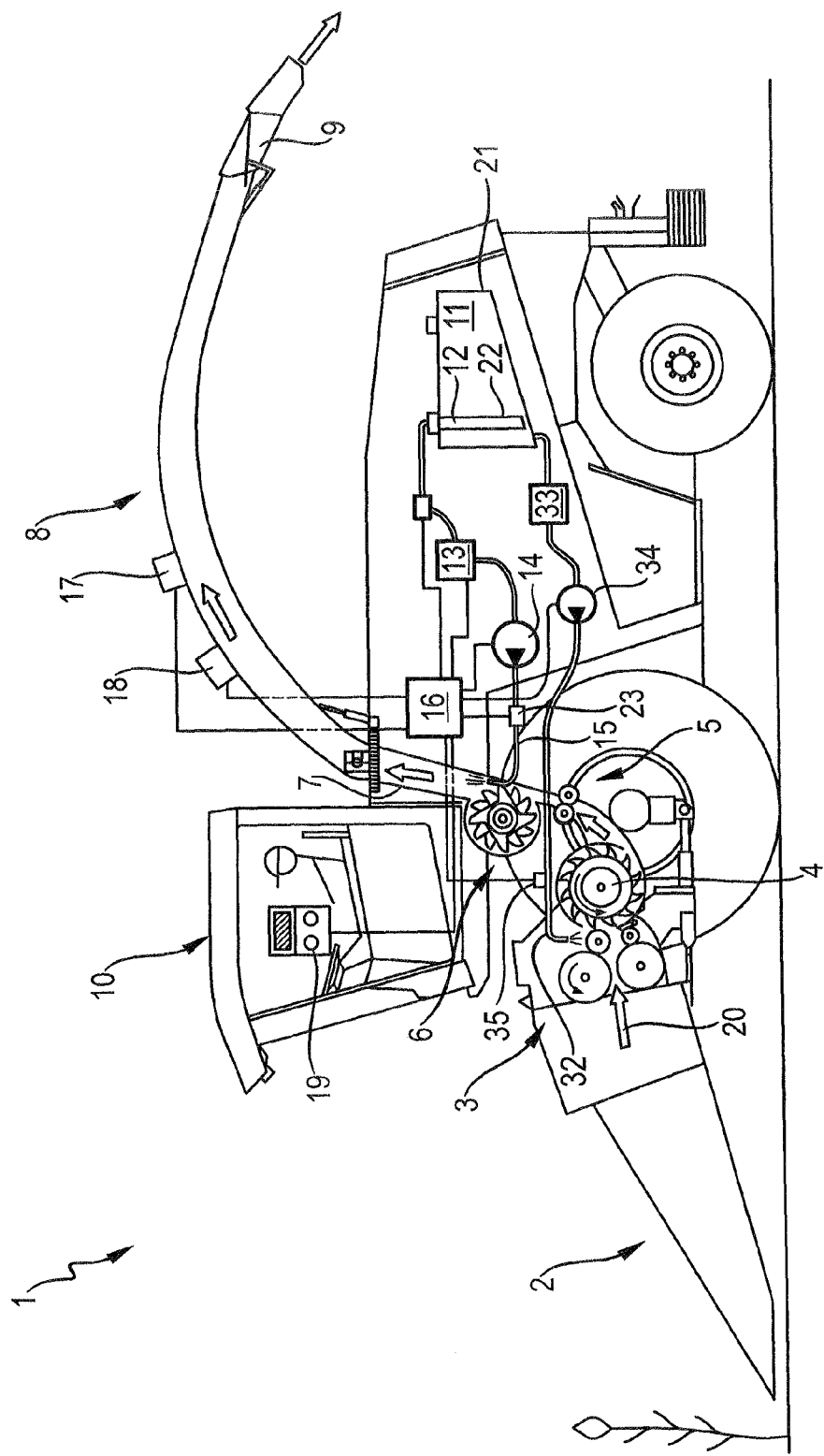
FIG. 4 presents a schematic side view of another embodiment of an agricultural harvesting machine constructed according to the inventive principles.

FIG. 4 shows a second exemplary embodiment of an agricultural harvesting machine embodied as a forage harvester. In this embodiment, separate supply systems are provided for the container 21 and the additional container 22. For example, the additional container 22 is connected to the injector 15, as described above, via a line connecting the mixing unit 13, the pump 14 disposed downstream thereof, and the flow meter 23, in order to apply the liquid 12 to the crop 20 by the injector 15. The container 21, however, is connected via a line that connects a separate mixing unit 33, an additional delivery pump 34, and a further flow meter 35 to an injector 32, which form a further supply system in order to apply the liquid 11 from the container 21. The mixing unit 33, the delivery pump 34, and the flow meter 35 have a signal-based connection to the control unit 16, in order to be controlled thereby.

According to the invention, more than one additional container 22 can be inserted into the container 21 via corresponding, additional openings and connected to the mixing unit via lines. This can be the case, for example, when there is a need to apply an additive to the crop in addition to a ULV ensilage agent 12. The additional container 22, which is inserted into the container 21 for water 11 or an ensilage-agent mixture, is not limited to use on a forage harvester. The container also can be used on a combine harvester, a baler, or a self-propelled forage wagon, since ensilage agent is used here as well.

LIST OF REFERENCE CHARACTERS 1 forage harvester
2 front harvesting attachment
3 intake conveyor assembly
4 chopper drum
5 conditioning device
6 post-accelerator
7 conveyor chute
8 transfer device
9 discharge flap
10 driver's cab
11 ensilage agent
12 water
13 mixing unit
14 delivery pump
15 injector
16 control unit
17 optical sensor
18 moisture sensor 19 control terminal
20 crop
21 container
22 additional container
23 flow meter
23' flow meter
24 flow meter
24' flow meter
25 filler neck
26 cover
27 neck
28 cover
29 section
30 section
31 valve
32 injector
33 mixing unit
34 delivery pump
35 flow meter As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A harvesting machine for picking up crop, comprising:
    a container with a closable filler neck configured to accommodate a first fluid;
    a supply system configured to feed the first fluid from the container to crop picked up by the harvesting machine; and
    an additional container;
    wherein the container has an opening and a cover configured to close the opening when positioned on the container;
    wherein the additional container is insertable in the container;
    wherein the additional container is fillable with a second fluid; and
    wherein contents of the additional container are mixable with the first fluid in the container.

2. The harvesting machine according to claim 1, wherein the additional container includes means for sealing the container toward the outside.

3. The harvesting machine according to claim 1, wherein the additional container is connected to the supply system.

4. The harvesting machine according to claim 1, wherein the additional container is designed as a cylindrical hollow body.

5. The harvesting machine according to claim 1, wherein the harvesting machine is embodied as a self-propelled forage harvester.

6. The harvesting machine according to claim 1, wherein the harvesting machine is embodied as a self-propelled combine harvester.

7. The harvesting machine according to claim 1, wherein the harvesting machine is embodied as a baler.

8. The harvesting machine according to claim 1, wherein the harvesting machine is embodied as a self-loading forage wagon.

* * * * *